Figure 1:
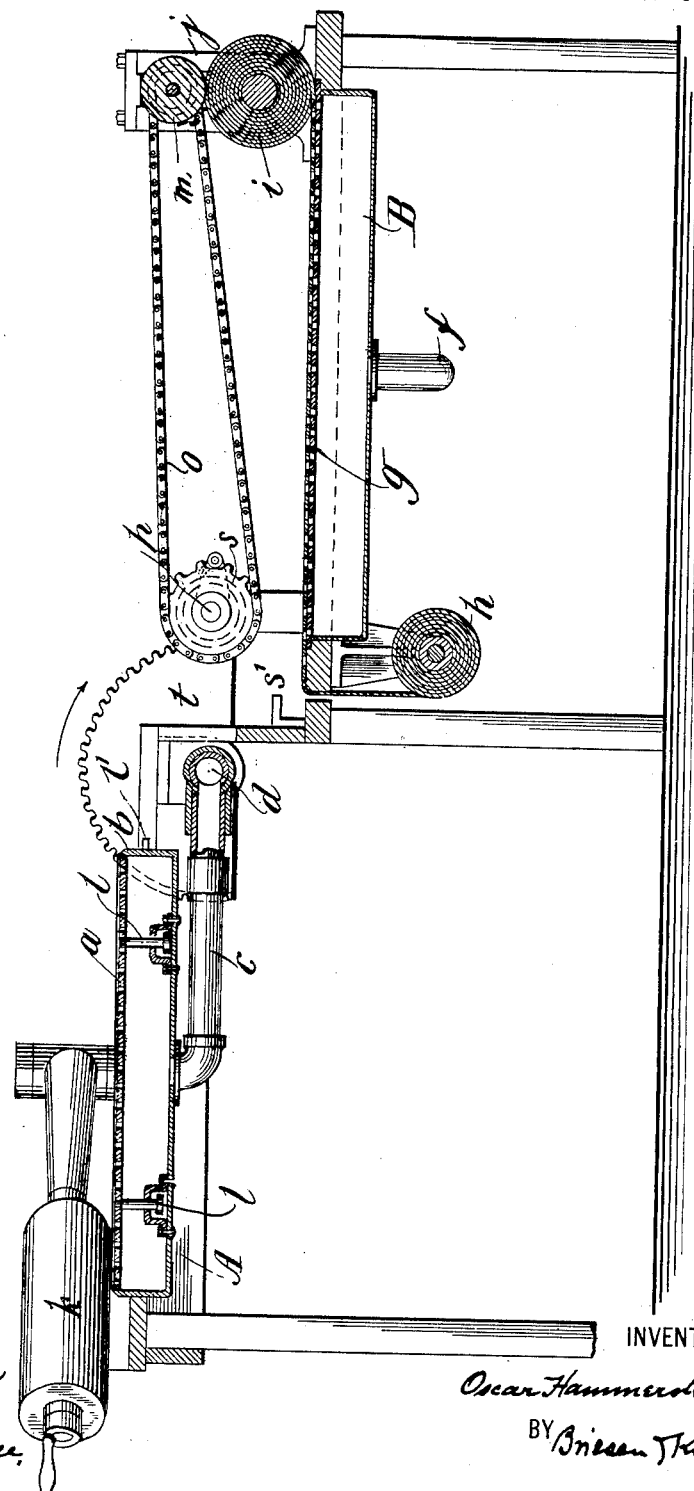

No. 675,441. Patented June 4, 1901.
O. HAMMERSTEIN.
PROCESS OF CUTTING AND STORING CIGAR WRAPPERS UNDER TENSION.
(Application filed Feb. 15, 1901.)
(No Model.) 6 Sheets—Sheet 1.

WITNESSES:

INVENTOR
Oscar Hammerstein
BY
ATTORNEYS

No. 675,441. Patented June 4, 1901.
O. HAMMERSTEIN.
PROCESS OF CUTTING AND STORING CIGAR WRAPPERS UNDER TENSION.
(Application filed Feb. 15, 1901.)
(No Model.) 6 Sheets—Sheet 2.
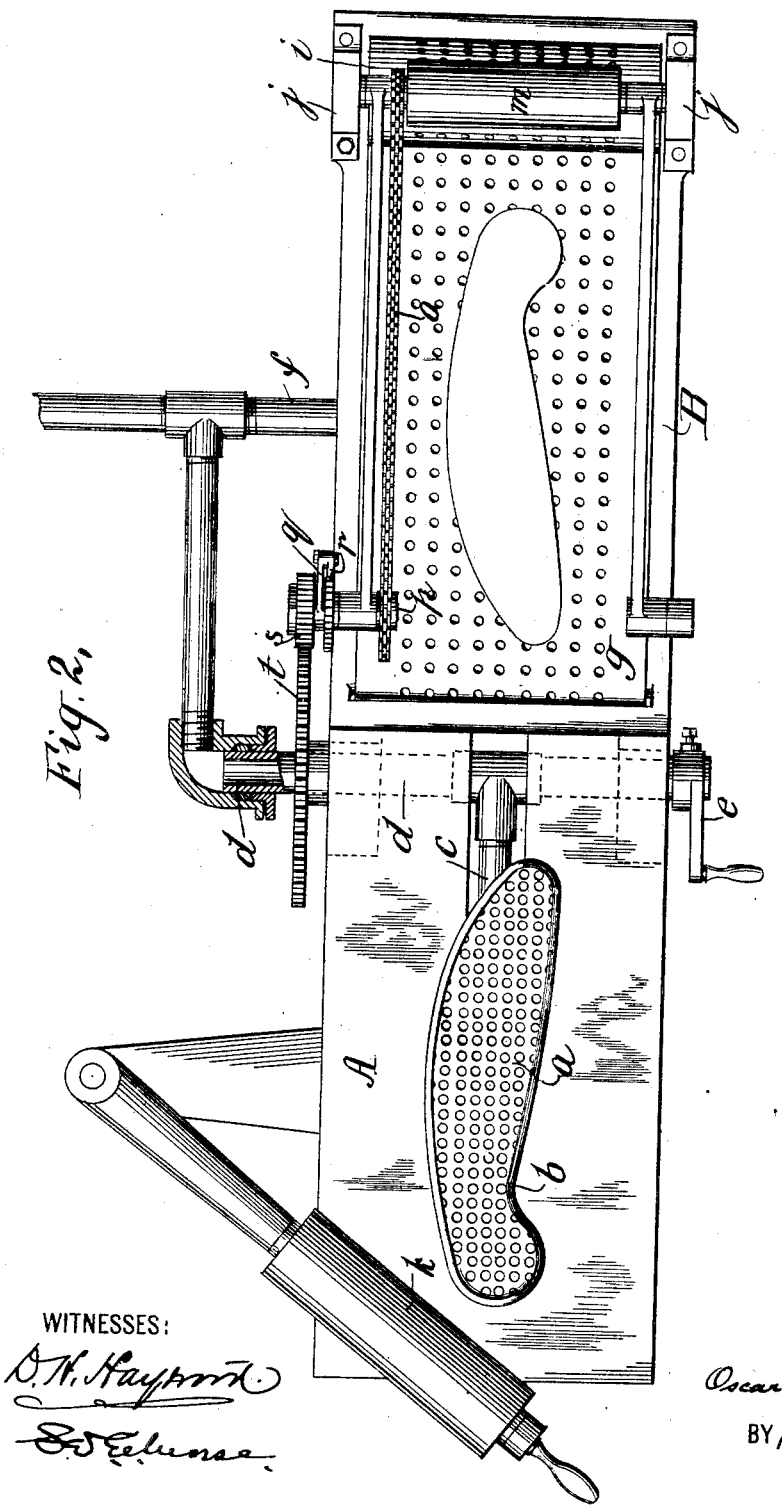
WITNESSES:
INVENTOR
Oscar Hammerstein
BY Briesen  Knauth
ATTORNEYS No. 675,441.  
O. HAMMERSTEIN.  
PROCESS OF CUTTING AND STORING CIGAR WRAPPERS UNDER TENSION.  
(Application filed Feb. 15, 1901.)  
(No Model.)  
Patented June 4, 1901.  
6 Sheets—Sheet 3.
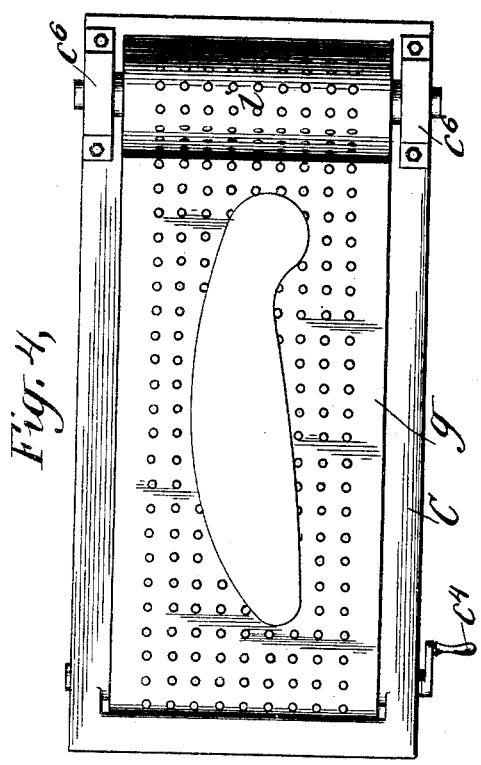
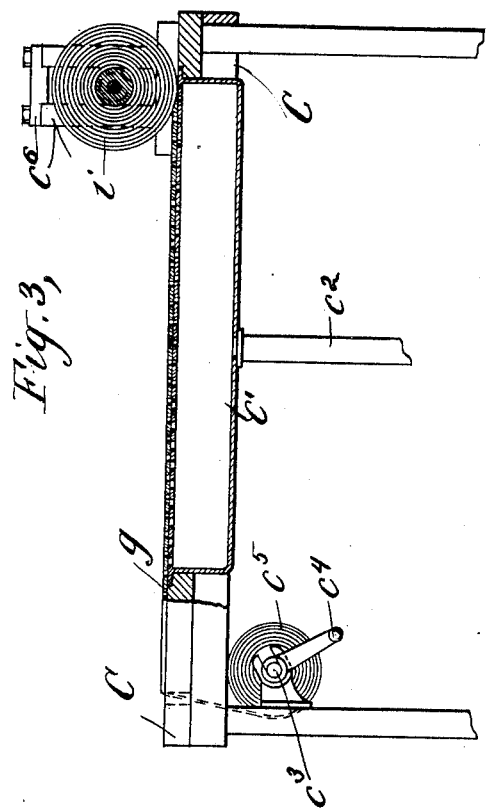
WITNESSES:
INVENTOR  
Oscar Hammerstein  
BY  
ATTORNEYS No. 675,441. Patented June 4, 1901.
O. HAMMERSTEIN.
PROCESS OF CUTTING AND STORING CIGAR WRAPPERS UNDER TENSION.
(Application filed Feb. 15, 1901.)
(No Model.)
6 Sheets—Sheet 4.
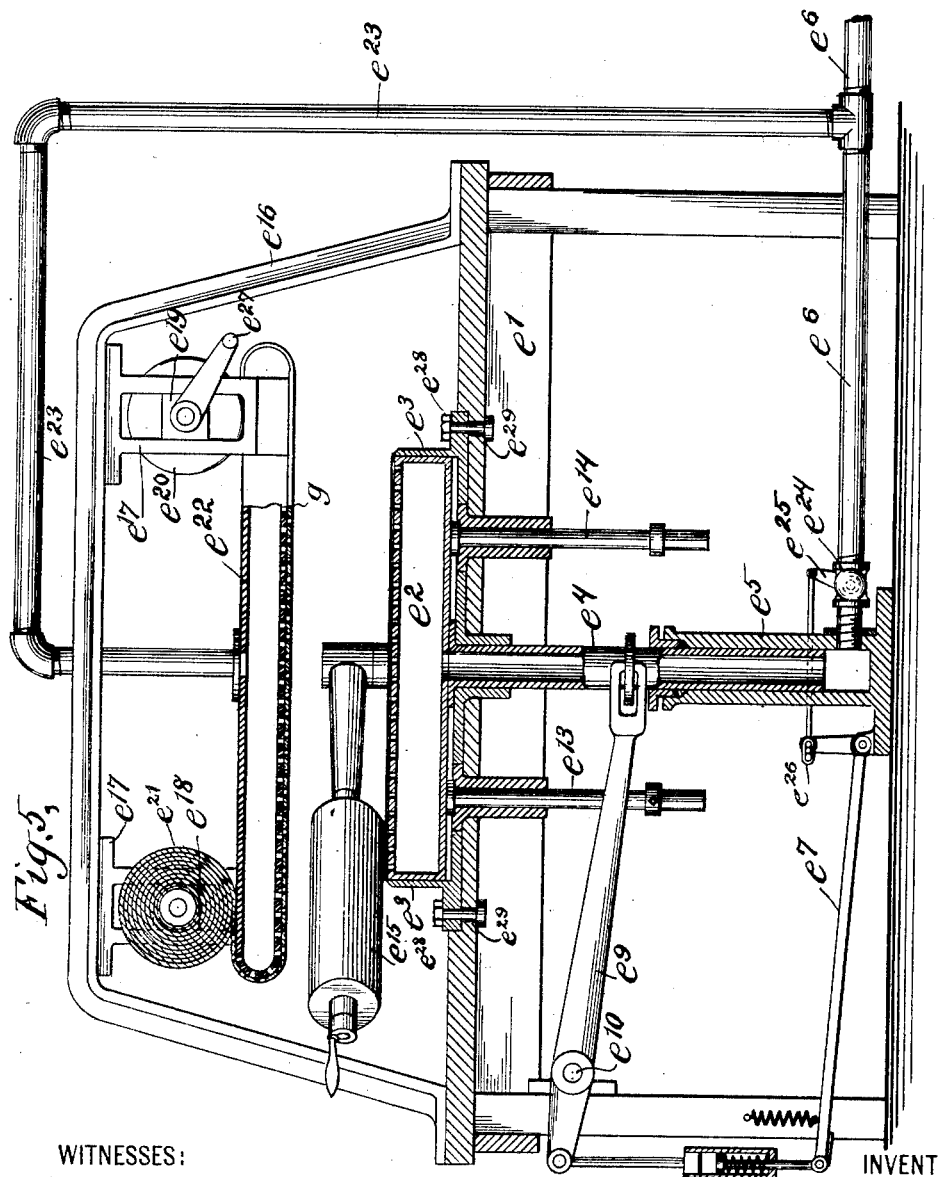
WITNESSES:
INVENTOR
Oscar Hammerstein
BY Briesen & Knauth
ATTORNEYS No. 675,441. Patented June 4, 1901.
O. HAMMERSTEIN.
PROCESS OF CUTTING AND STORING CIGAR WRAPPERS UNDER TENSION.
(Application filed Feb. 15, 1901.)
(No Model.) 6 Sheets—Sheet 5.
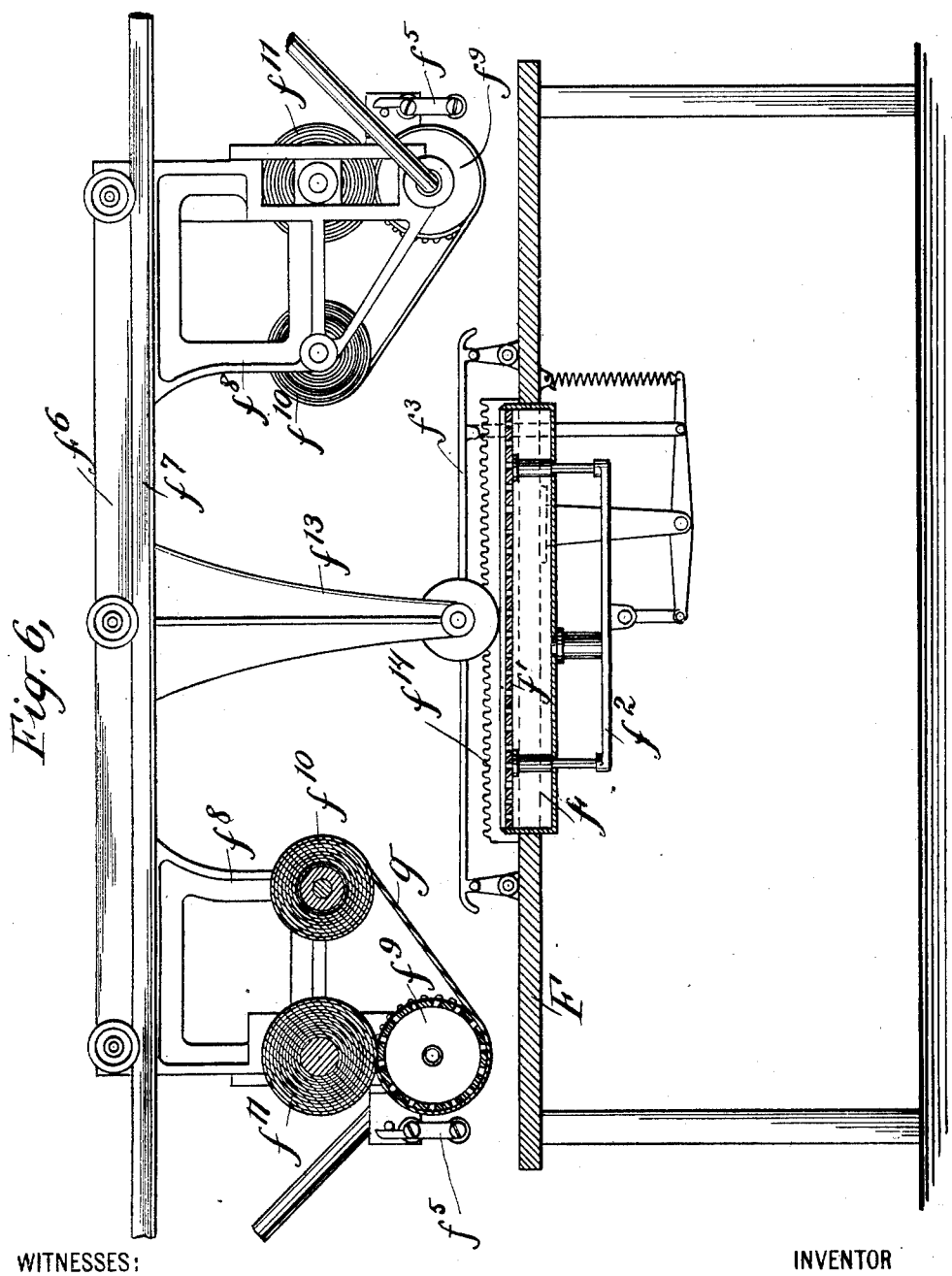
WITNESSES:
INVENTOR
Oscar Hammerstein
BY
ATTORNEYS No. 675,441. Patented June 4, 1901.
O. HAMMERSTEIN.
PROCESS OF CUTTING AND STORING CIGAR WRAPPERS UNDER TENSION.
(Application filed Feb. 15, 1901.)
(No Model.) 6 Sheets—Sheet 6.
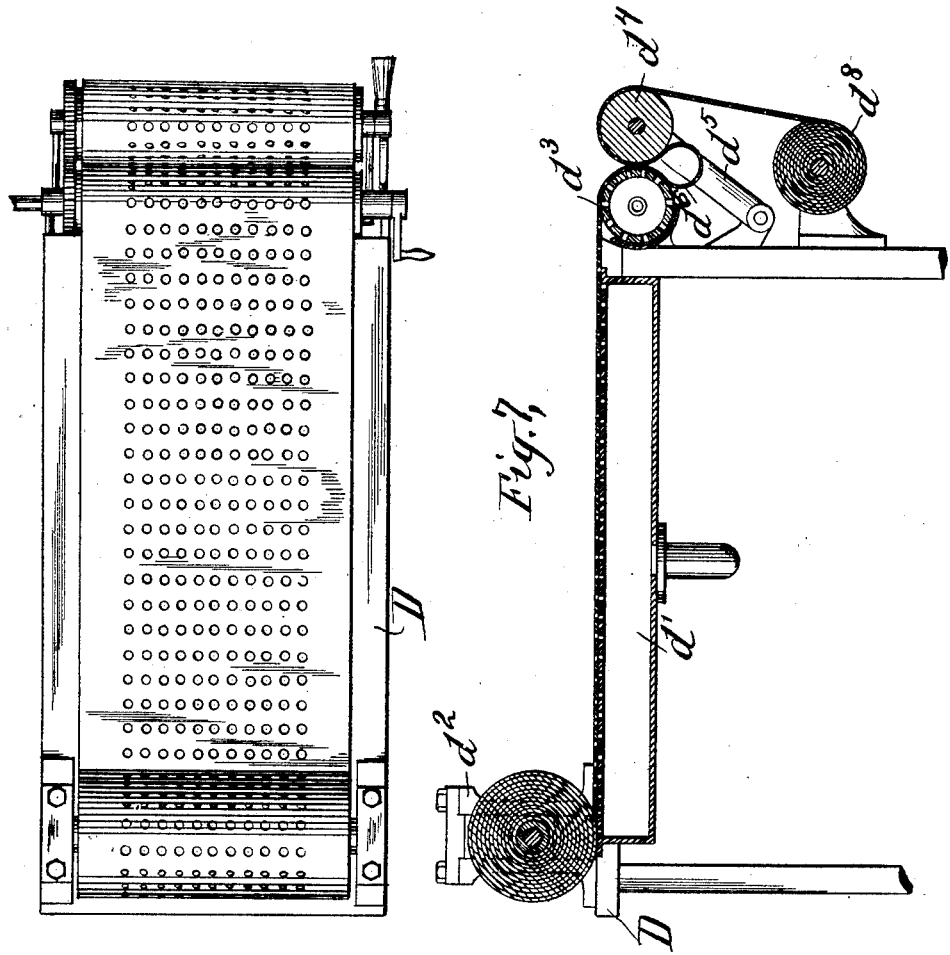
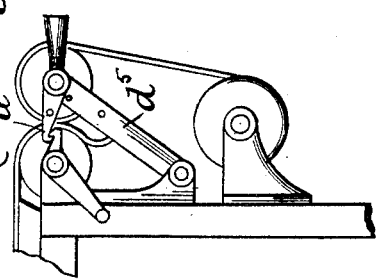
WITNESSES:
INVENTOR
BY
ATTORNEYS

UNITED STATES PATENT OFFICE.

OSCAR HAMMERSTEIN, OF NEW YORK, N. Y.

PROCESS OF CUTTING AND STORING CIGAR-WRAPPERS UNDER TENSION.

SPECIFICATION forming part of Letters Patent No. 675,441, dated June 4, 1901.

Application filed February 15, 1901. Serial No. 47,394. (No model.)

*To all whom it may concern:*

Be it known that I, OSCAR HAMMERSTEIN, a citizen of the United States, residing in the city, county, and State of New York, have invented a new and Improved Process of Cutting and Storing Cigar-Wrappers under Tension, of which the following is a specification.

My invention relates to a process of producing cigar-wrappers and the like wherein the cigar-wrappers are cut out and transferred to a storage device, maintaining all the while the proper tension upon the said wrapper.

My invention also relates to a process of producing a roll of cigar-wrappers in which the wrappers are held under tension in convenient form to be rolled around a bunch on a suction-table under the stress of air-suction, which roll of cigar-wrappers may be sold as an article of trade, thus creating a new industry.

In the accompanying drawings I have shown by way of illustration apparatus for carrying out my said process. It will be understood, however, that the illustrations, while showing an apparatus capable of carrying out the process, are nevertheless more or less diagrammatic in order to avoid cumbersome details.

The invention will be explained with the aid of the said drawings and the salient features of the invention pointed out in the claims at the end of this specification.

In the drawings, Figure 1 is an elevation of a suction and transfer table and a suction storage device. Fig. 2 is a plan view thereof. Fig. 3 is a sectional side elevation of a suction rolling-table. Fig. 4 is a plan view thereof. Fig. 5 is a sectional elevation of an improved form of wrapper cutting, transferring, and storing apparatus. Fig. 6 is a similar side elevation of another form of automatic wrapper cutting, transferring, and storing apparatus. Fig. 7 is a sectional side elevation of a combined suction rolling-table and cigar-rolling machine. Fig. 8 is a plan view thereof, and Fig. 9 is a detail side view of a cigar-rolling apparatus.

Before describing the process in detail I will state that it has heretofore been proposed to cut a cigar-wrapper by what is known as a "suction-table" and to thereupon place the bunch upon the said suction-table and to roll the cigar at once. This procedure is expensive, for the reason, first, that the time of an expensive skilled laborer is employed in performing an operation—to wit, the rolling operation ordinarily performed by a cheaper class of labor—and, second, the table remains idle during the time employed in rolling the cigar. By my invention these objections are obviated and the wrapper-cutter is employed solely to cut the wrappers and none of his time or that of the table is lost and the rolling is done by a cheaper class of skilled labor either by hand or by machinery.

Referring particularly to Figs. 1 and 2 of the drawings, A represents a suction-table provided with a freely-movable sucker-plate $a$, surrounded by a knife or cutting rim $b$, and with a suction-pipe $c$. The entire suction device is pivoted on the pipe $d$, which communicates with the pipe $c$, so that the said suction device may be swung by the handle $e$ on the axis of the pipe $d$. A roll $k$ is provided to aid in the cutting of the wrapper. The sucker-plate $a$ is adapted to fall freely clear of the surrounding cutter, being carried on stop-bolts $l$ $l$, which limit its movement. B is another suction-table, which, however, is not provided with a cutter, but is perforated at the top with numerous apertures and provided with a suction-pipe $f$. This table is provided with a pervious or perforated web or apron $g$, which is adapted to be rolled upon rollers $h$ and $i$. The roller $i$ is mounted in slotted standards $j$ and is driven by a roller $m$, driven by a chain or belt $o$ from a shaft $p$. This shaft $p$, as shown in Figs. 1 and 2, is provided with a pawl-and-ratchet device $q$ $r$ and a pinion $s$, which pinion $s$ meshes in a suitable toothed arc $t$, carried by the pipe $d$. When the toothed arc is swung in the direction of the arrow, Fig. 1, the pawl $q$ will rattle over the teeth of the ratchet $r$, and upon the return movement of the arc the pawl will take hold of the teeth and effect a forward feed of the web or apron equal to the desired movement.

The operation of the device so far described is as follows: The operator selects and spreads the delicate moistened tobacco-leaf upon the suction device $a$ and passes the roll $k$ over the leaf. The roll $k$ is returned to its normal position clear of the suction device, which is swung on its axis, with the exhaust still on, until it comes into close proximity to the web or apron $g$, whereupon the sucker-plate will fall forward clear of the surrounding knife of its own weight, being prevented from falling entirely away by the stop-bolts $l$, the knife being prevented from contacting with the apron, and the suction-table B will immediately suck the leaf against the apron $g$ and hold it there under the stress of the suction, whereupon the swinging suction device will be swung back to its original position, (shown in Fig 1,) and as it swings the toothed arc, pawl-and-ratchet device, and connected mechanism will rotate the roll $i$, thereby storing the wrapper lying on the apron between the layers of the apron and maintaining the wrapper under the proper tension. A lug $l'$ is adapted to come against a stop $s'$ to limit the swing of the suction apparatus, so as not to cut the apron $g$. When all the effective length of the apron has been unwound from the roller $h$ and wound upon the roller $i$, the rolled-up apron will contain a large number of wrappers between its layers, which wrappers will be maintained under proper tension.

It will be observed that when the cut wrapper is transferred from the cutting-die or suction device, upon which the wrapper is cut, it will be inverted or reversed in transit, so that the surface of the leaf or wrapper which was uppermost in the cutting operation will lie against the apron $g$ in proper position for rolling.

In the process, no matter by what organisms it may be carried out, the wrapper is maintained stretched and at substantially the same tension throughout the several steps of cutting out, transferring, and rolling the web, with the wrapper, into a roll. These rolls may be properly preserved and sold as an article of commerce, as the web will maintain the wrappers smooth and stretched in all needed directions under the proper tension.

The rolled-up apron may be transferred to the cigar-rolling table. (Shown in Figs. 3 and 4.) In these figures, C represents the rolling-table, having a suction box or table $c'$, a suction-pipe $c^2$, and a shaft $c^3$, provided with a handle $c^4$ or other suitable device for winding the web or apron $g$ upon the roll $c^5$. The table is also provided with slotted standards $c^6$, like the slotted standards $j$ in Figs. 1 and 2.

The roll $i$ is transferred from the table B to the table C. It will be understood that by turning the crank $c^4$ the apron will be unwound from the roll $i$, will pass over the suction-table, and will be wound upon the roll $c^5$. The cigar is rolled on this suction-table by a cheap class of skilled labor, and it will be found that throughout the operation the wrapper is held under tension by the various devices. It will thus be seen that the operator who cuts the wrappers is relieved from the necessity of rolling the cigars, which rolling is done by a cheaper class of labor. The cigars may be rolled upon the table B; but as the cutting operation is much more expeditious than the rolling operation it will be found advantageous to employ a separate rolling-table.

Instead of rolling the cigars by hand the cigars or cheroots may be rolled automatically by the devices shown in Figs. 7, 8, and 9. In Figs. 7 and 8, D represents the suction-table, provided with a suction-box $d'$ and slotted standards $d^2$. The table also has a suction-roll $d^3$ and a coöperating roll $d^4$, which coöperating roll is carried upon a pair of arms $d^5$, by which it may be swung back and forth to enable the operator to obtain access to the bight or loop $d^6$ of the apron, where the cigar is rolled in the usual manner. The rolls $d^3$ $d^4$ are provided with gear-wheels, which mesh with each other, and a locking device $d^7$ is provided to hold the swinging roll $d^4$ up to its work. It will of course be understood that rolling may be done by hand upon this table. After the apron passes from the cigar-rolling device it is wound upon the roll $d^3$ in any suitable or desired manner. A construction operating upon the same general principle is shown in Fig. 5. In this figure the table $e'$ is provided with a suction-box $e^2$, which is surrounded by a knife $e^3$. A suction-pipe $e^4$ telescopes within another pipe $e^5$, which is connected to the air-suction apparatus by the pipe $e^6$. The suction box $e^2$ is adapted to rise and fall, (or otherwise move to transport the wrapper,) the knife remaining stationary on the table. This rising-and-falling movement may be imparted to the suction-table by the treadle or foot-lever $e^7$, which treadle or foot-lever is connected by a spring-link $e^8$ to a lever $e^9$, journaled or pivoted at $e^{10}$. The lever $e^9$ is connected to the pipe $e^4$, and steady-pins $e^{13}$ $e^{14}$ are provided to guide the suction device in its up-and-down movement. By pressing upon the treadle $e^7$ the lever $e^9$ is caused to raise and lower the suction-box $e^2$, which is guided by the steady-pins $e^{13}$ $e^{14}$. A suitable roller $e^{15}$ may be employed to coöperate with the knife to effect the cutting of the leaf. Mounted on the table or otherwise suitably supported is a framework $e^{16}$, provided with slotted depending brackets $e^{17}$, within which the journals $e^{18}$ $e^{19}$ operate. The journal $e^{19}$ carries the shaft for the roll $e^{20}$, and the journal $e^{18}$ carries the shaft for the roll $e^{21}$. Depending from the brackets $e^{17}$ is a suction-box $e^{22}$, which is connected by the pipe $e^{23}$ with the pipe of the air-suction apparatus $e^6$. A separate cut-off is provided for the air-suction in this apparatus and is shown in the present instance as consisting of a valve $e^{24}$, operated by an arm $e^{25}$, operatively connected by a slotted link $e^{26}$ with the treadle $e^7$. A suitable handle or other driving means $e^{27}$ may be connected to the shaft of the roll $e^{19}$. The operation of the structure is as follows: The operator puts the leaf upon the suction-table and cuts the same by rolling the roller $e^{15}$ over it. He then presses upon the treadle, which has the effect of raising the suction-box $e^2$ and bringing the same against the apron $g$ on the suction-box $e^{22}$. It will be understood that this apron is connected to the roll $e^{20}$ and is wound upon the said roll as it unwinds from the roll $e^{21}$. At the instant that the suction-box comes into contact with the apron the air-suction is cut off by the valve $e^{24}$ and the leaf instantly adheres to the apron $g$, is carried along with the said apron and stored between the layers of the apron upon the roll $e^{19}$, and maintained at the proper tension. The suction-box $e^2$ and knife $e^3$ are preferably made adjustable, turning upon the pipe $e^4$, which is telescoped in the pipe $e^5$ and held in its set position by the pin-and-slot connection $e^{28}$ $e^{29}$. The object of thus making the suction and wrapper-cutting apparatus adjustable is to be enabled to put the leaf upon the apron in a position inclined with respect to the median line of the said apron, so that the cut wrapper will be presented to the operator when the apron is unwound in proper position for rolling the cigar. This is especially advantageous in cases where machine-rolling is resorted to.

In Fig. 6 I have shown a modified construction wherein the suction-table F is provided with a suction-box $f$, whose edge constitutes a knife, and with a suction-plate $f'$, carried by a frame $f^2$, which is caused to rise and fall by a cam $f^3$, which is actuated by pivoted arms $f^5$. An overhead frame $f^6$ runs upon rollers upon a track $f^7$ and has depending therefrom at each end brackets $f^8$. These brackets carry journaled therein suction-rolls $f^9$, rolls $f^{10}$, upon which an apron $g$ is wound, and storage-rolls $f^{11}$. Depending brackets $f^{13}$ carry a roll which is provided with a pinion engaging in a rack $f^{14}$ on the table. The operation is as follows: The leaf is placed upon the suction apparatus by the operator, and the entire carriage $f^6$ is moved on its track. This has the effect of cutting the wrapper, and when the roll $f^{15}$ has passed off the suction apparatus one or the other of the suction-rolls $f^9$ brings the apron $g$ into contact with the suction-plate $f'$, carrying the cut wrapper, which suction-plate has been raised slightly by the arm $f^5$ striking upon the cam $f^3$. As the suction-plate $f'$ is raised clear of the suction-box $f$ the air-suction will be broken and the wrapper will adhere firmly to the apron $g$ under the influence of the suction-roll $f^9$ and will then be wound upon the storage-roll $f^{11}$ in the usual manner.

In this specification I do not mean to confine myself specifically to the manipulation of a tobacco-leaf nor to cigar manufacture, but intend, so far as the state of the art will permit, to include all the uses to which the invention may be put.

Having described my invention, what I claim, and desire to secure by Letters Patent, is—

1. In the manufacture of cigars, the process which consists in successively cutting a series of cigar-wrappers while subjecting the same to the stress of air-suction, successively transferring the said wrappers from the cutting position while maintaining the same under the stress of air-suction, and storing the same with the aid of air-suction in positions for use and out of contact with each other under sufficient stress to hold them at substantially the same amount of tension as that under which they were cut.

2. The process of producing a roll of cigar-wrappers held under tension in form for use, which consists in successively cutting the wrappers under the stress of air-suction, successively transferring the said wrappers while maintaining the same under the tension of air-suction, to a web of flexible material, and rolling the said web with the wrappers separate from each other into a roll while continuously maintaining the said wrappers under a substantially unvarying amount of tension throughout the several steps.

3. The process of preparing cigar-wrappers for manufacturing purposes, which consists in the successive steps of cutting out, transferring and storing the wrappers in position for future sale and use, while continuously maintaining said wrappers smooth and stretched in all directions under substantially the same tension throughout the several steps.

OSCAR HAMMERSTEIN.

Witnesses:
GEO. E. MORSE,
OTTO V. SCHRENK.